Aug. 25, 1959  A. G. POSEY  2,901,197
SPOON HOLDER
Filed April 12, 1957
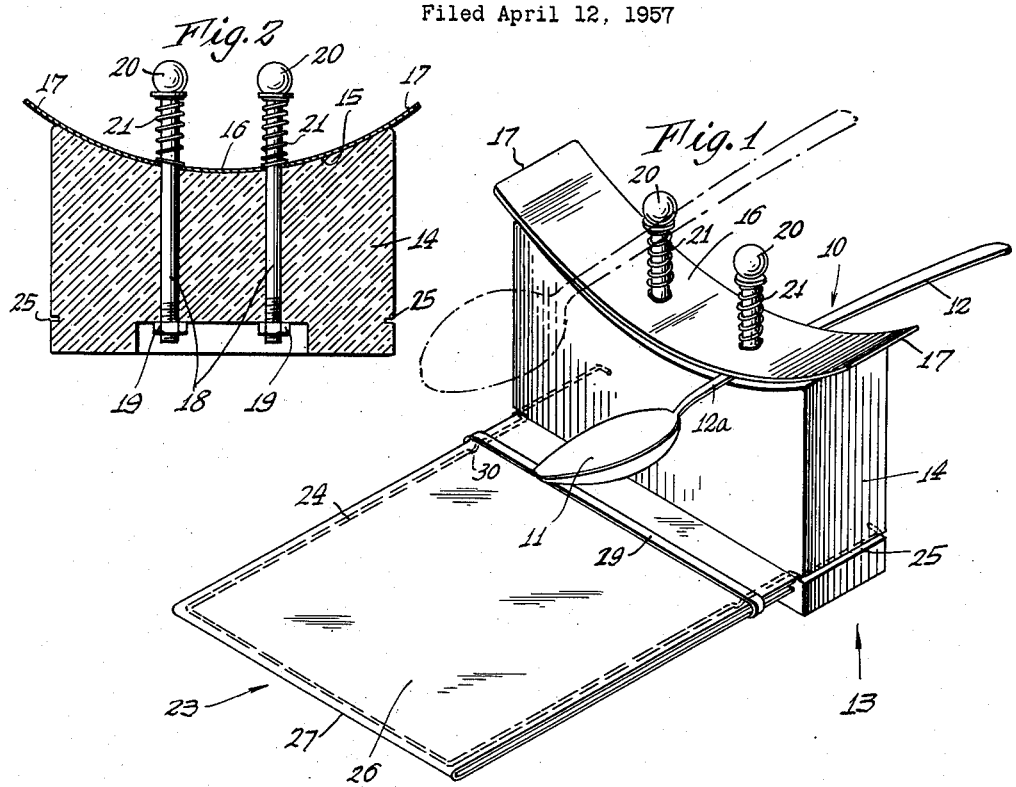
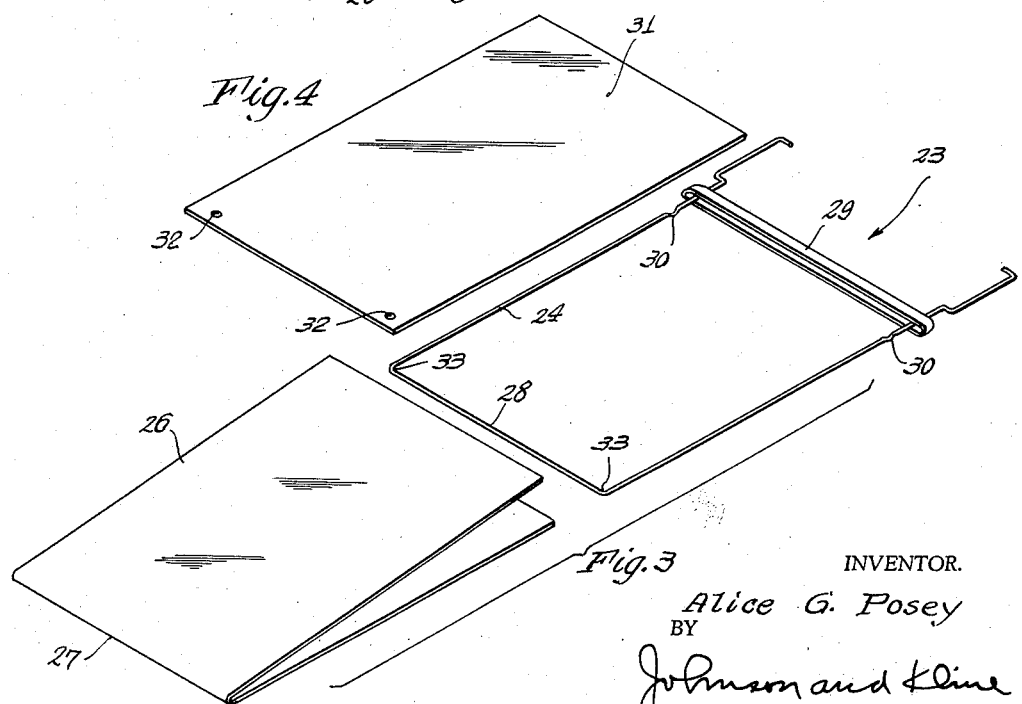
INVENTOR.
Alice G. Posey
BY
Johnson and Kline
ATTORNEYS

United States Patent Office 2,901,197
Patented Aug. 25, 1959

2,901,197

SPOON HOLDER

Alice G. Posey, White Plains, N.Y.

Application April 12, 1957, Serial No. 652,458

3 Claims. (Cl. 248—37.3)

The present invention relates to a spoon holder and more particularly to a holder for use with cooking spoons which are intermittently immersed in substances being cooked or mixed.

When cooking it is usually desirable to stir or taste the substance being cooked which requires the use of a cooking utensil such as a spoon. While a spoon is shown and referred to, it will be obvious that the holder of the present invention may be utilized with other cooking utensils such as a spatula, etc. Since the spoon is not continually left in the container holding the cooking substance, it is necessary that a holder be provided for the spoon when it is not being used. Generally these holders have consisted of metal or porcelain trays on which the spoon heel and handle are rested but this has not been found satisfactory because of the sticking of the spoon to the holder and the contact of the spoon with undesirable matter.

It is an object of the present invention to provide a spoon holder which obviates the above disadvantages of presently known spoon holders and maintains the spoon so that only its handle is in contact with the holder.

A further object of the present invention is to provide a spoon holder of the above type for the collection of drippings from the spoon.

A feature of the present invention, utilized in attaining the above objects, is a holder having a base and a resiliently biased plate so that the spoon handle may slide between the plate and the base and held thereby. The spoon bowl is thus held suspended. The handle is easily inserted therebetween by reason of the curvature of the plate and the ends overhanging the base so that only a single motion is required.

Another feature of the present invention is the provision of a drip collector which is detachably secured to the base. The collector may, as in one embodiment, use a disposable paper liner to catch the drippings or it may as in another embodiment employ a liner which is washable, such as a metal sheet.

Other features and advantages will hereinafter appear.

In the drawing:

Figure 1 is a perspective view partly in section showing the spoon holder of the present invention holding a spoon.

Fig. 2 is a vertical cross-section of the base.

Fig. 3 is an exploded view of the drip collector.

Fig. 4 is a perspective of a washable liner.

Referring to the drawing, there is shown in Figure 1 a cooking spoon 10 having a bowl portion 11 and a handle 12 including a shank portion 12a. As shown, the spoon is held in elevated suspended position by the spoon holder of the present invention, generally indicated by the reference numeral 13, engaging only the shank 12a of the spoon. This manner of support maintains the bowl portion of the spoon in suspended relation and out of contact with any surface. In addition the spoon is supported substantially at its mass midpoint since its center of gravity is located adjacent the shank portion. The bowl portion of the spoon is the part which is usually immersed in the cooking substance.

The holder 13 has a base 14 which may be metal or porcelain and of sufficient weight to provide stability when holding a spoon. While the base 14 may have any desirable figuration, it is shown having a substantially rectangular horizontal cross-section. The top surface 15 of the base is preferably curved and a clamping plate 16 is mounted for biasing engagement therewith. The plate 16 has substantially the same shape as the top surface. However, the ends 17 of the plate are shown projecting beyond the side surfaces of the base for reasons hereinafter apparent.

The plate is fastened to the base for vertical movement with respect thereto by two screws 18 extending vertically through the base and having attached at their lower end, nuts 19. The upper end of each screw has an enlarged spherical head 20 and located between the head and the plate are springs 21. The springs resiliently force the plate into engagement with the top surface of the base. If desired, the mounting pins or studs having their lower ends fastened in the base by threads may be used in place of the nuts shown.

As shown in Fig. 1, the spoon shank 12a is inserted between the clamping plate and the top surface of the base up to the screws. While only one spoon is shown on one side of the base, it is within the scope of the present invention to hold another spoon on the other side of the base. This other spoon is indicated in broken lines. To facilitate the positioning and to enable the forcing of the plate from the top surface simply by the movement of the spoon handle, the plate is crescent shaped and is longer than the base so that the ends 17 overhang. It will, of course, be obvious that if it is desired to have the ends of the plate vertically even with the vertical sides of the base, that the upper corners of the sides could be beveled or angled inwardly to make the ends 17 overhang the beveled portion and yet have its edges remain vertically aligned with the sides.

As heretofore mentioned, the spoon by reason of continually being dipped in and out of the cooking substance, is covered by the cooking substance and this normally drips off the bowl of the spoon. In order to provide for the collection of the drippings, the base is provided with a drip collector generally indicated by the reference numeral 23 which is substantially horizontal and adapted to be located beneath the bowl of the spoon. This collector, as shown in Figs. 1 and 3, includes a somewhat U-shaped wire support 24 whose outer ends are bent as shown for interlocking in slots 25 formed in the sides of the base.

The present invention provides for two embodiments of liners for the collector, one of which may be formed of paper, as for example, paper toweling so as to be economically disposable and the other of a washable somewhat rigid sheet, such as metal. The disposable liner is indicated by the reference numeral 26 and consists of a folded-over sheet of paper. The paper is positioned on the wire support with the fold 27 of the paper engaging the bight 28 of the support 24. In order to hold the paper liner on the support and maintain the latter fixed to the base there is provided a rigid band 29 preferably of metal which also compresses the legs of the support. The support is bent to have nibs 30 to prevent sliding of the band along the support.

The washable drip collector liner 31 may be formed out of sheet metal and has provided two downwardly extending protuberances 32 which engage the corners 33 of the wire support. The metal band 29 is also used with this liner to keep the liner in place and to detachably fasten the wire support to the base though, if desired, the support may be firmly secured to the base by well-known fastening means such as rivets, bolts, etc.

It will be appreciated that there has been set forth a spoon holder which provides for maintaining the portion of the spoon which is immersed in the cooking substance in a suspended relation. Any drippings are collected by a drip collector detachably connected to the holder. This collector in one embodiment of the invention is made to be economically disposable while in another embodiment of the invention it is washable.

Variations and modifications may be made within the scope of the claims and portions of the improvements may be used without others.

I claim:

1. A holder for a spoon having a handle comprising a base, slots formed in the sides of the base member, a substantially U-shaped support having the outer ends of its legs positioned in the slots of the base and extending substantially horizontally from the base, a liner on the support, a band for holding the liner on the support, and means on the base engageable with the handle of the spoon for holding the spoon suspended above the liner whereby the liner serves to collect any drippings from the spoon and yet is out of contact with the spoon.

2. The invention as defined in claim 1 in which the liner is a substantially rigid sheet of washable material.

3. The invention as defined in claim 1 in which the liner consists of a folded-over piece of paper with the fold adapted to be positioned adjacent the bight portion of the support member.

References Cited in the file of this patent

UNITED STATES PATENTS

| | | |
|---|---|---|
| 789,345 | Welsh | May 9, 1905 |
| 832,421 | Rivet | Oct. 2, 1906 |
| 1,369,945 | Stearns | Mar. 1, 1921 |
| 1,774,267 | Hanke | Aug. 26, 1930 |
| 2,090,176 | Besancon | Aug. 17, 1937 |
| 2,132,895 | Fewster | Oct. 11, 1938 |
| 2,203,538 | Meilink | June 4, 1940 |
| 2,371,537 | Mangini | Mar. 13, 1945 |
| 2,481,774 | Norlin | Sept. 13, 1949 |
| 2,554,650 | Waite | May 29, 1951 |
| 2,594,473 | McCoy | Apr. 29, 1952 |